(12) United States Patent
Thackeray

(10) Patent No.: US 9,360,136 B2
(45) Date of Patent: Jun. 7, 2016

(54) DOUBLE HANGAR

(71) Applicant: Michael Thackeray, Alta Loma, CA (US)

(72) Inventor: Michael Thackeray, Alta Loma, CA (US)

( * ) Notice: Subject to any disclaimer, the term of this patent is extended or adjusted under 35 U.S.C. 154(b) by 0 days.

(21) Appl. No.: 14/843,086

(22) Filed: Sep. 2, 2015

(65) Prior Publication Data

US 2015/0377388 A1    Dec. 31, 2015

Related U.S. Application Data

(62) Division of application No. 14/287,447, filed on May 27, 2014, now Pat. No. 9,127,787.

(51) Int. Cl.
| | |
|---|---|
| *F16L 3/22* | (2006.01) |
| *F16L 3/237* | (2006.01) |
| *F16L 3/12* | (2006.01) |
| *F16L 3/24* | (2006.01) |
| *F16L 3/223* | (2006.01) |
| *F16L 3/133* | (2006.01) |

(52) U.S. Cl.
CPC . *F16L 3/237* (2013.01); *F16L 3/12* (2013.01); *F16L 3/1218* (2013.01); *F16L 3/133* (2013.01); *F16L 3/223* (2013.01); *F16L 3/24* (2013.01)

(58) Field of Classification Search
CPC ............... F16L 3/237; F16L 3/12; F16L 3/24; F16L 3/233; F16L 3/1218; F16L 3/133
See application file for complete search history.

(56) References Cited

U.S. PATENT DOCUMENTS

| | | | | | |
|---|---|---|---|---|---|
| 2,384,440 | A | * | 9/1945 | Carr | H02G 7/10 248/61 |
| 4,245,806 | A | * | 1/1981 | Vangreen | F16L 3/133 248/59 |
| 2012/0318934 | A1 | * | 12/2012 | Thomas | F16L 3/1218 248/58 |

* cited by examiner

Primary Examiner — Amy Sterling
(74) Attorney, Agent, or Firm — Raymond Sun

(57) ABSTRACT

A pipe hanging assembly that includes a single piece of steel having a first upper horizontal section, second and third angled sections coupled to the first section, fourth and fifth vertical sections extending vertically from the second and third sections, respectively, sixth and seventh vertical sections extending vertically and parallel to the fourth and fifth sections, respectively, and eighth and ninth curved sections. The eighth curved section connects the fourth and sixth sections to form a first U-shaped holder, and the ninth curved section connects the fifth and seventh sections to form a second U-shaped holder, with the eighth section disposed at a different elevation than the ninth section. Two different pipes can be supported in the first and second U-shaped holder.

2 Claims, 5 Drawing Sheets

DOUBLE HANGAR

BACKGROUND OF THE INVENTION

1. Field of the Invention

The present invention relates to a hanger that is used in the plumbing and mechanical industry, and in particular, to a hanger that supports two pipes.

2. Description of the Related Art

Hangers are used in the plumbing and the mechanical industry for the installation of various types of pipes. In particular, these hangers support a length of pipes from one location to another.

Conventional hangers include clevis hangers that were designed to have only one U-bracket under one support yoke bracket, thereby allowing only one pipe to be supported under one yoke bracket. This type of hanger suffers from several drawbacks. First, the U-bracket on these hangers is not seismically secure to yoke. Second, this type of hanger can only support one pipe, so additional hangers need to be used to support two or more pipes that extend in parallel. This increases the amount of material used, and adds complexity and cost to the hanging system.

SUMMARY OF THE INVENTION

To overcome the above-mentioned deficiencies, an object of the present invention is to provide a pipe hanging assembly that includes a single piece of steel or metal having a first upper horizontal section, second and third angled sections coupled to the first section, fourth and fifth vertical sections extending vertically from the second and third sections, respectively, sixth and seventh vertical sections extending vertically and parallel to the fourth and fifth sections, respectively, and eighth and ninth curved sections. The eighth curved section connects the fourth and sixth sections to form a first U-shaped holder, and the ninth curved section connects the fifth and seventh sections to form a second U-shaped holder, with the eighth section disposed at a different elevation than the ninth section. Two different pipes can be supported in the first and second U-shaped holder.

DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
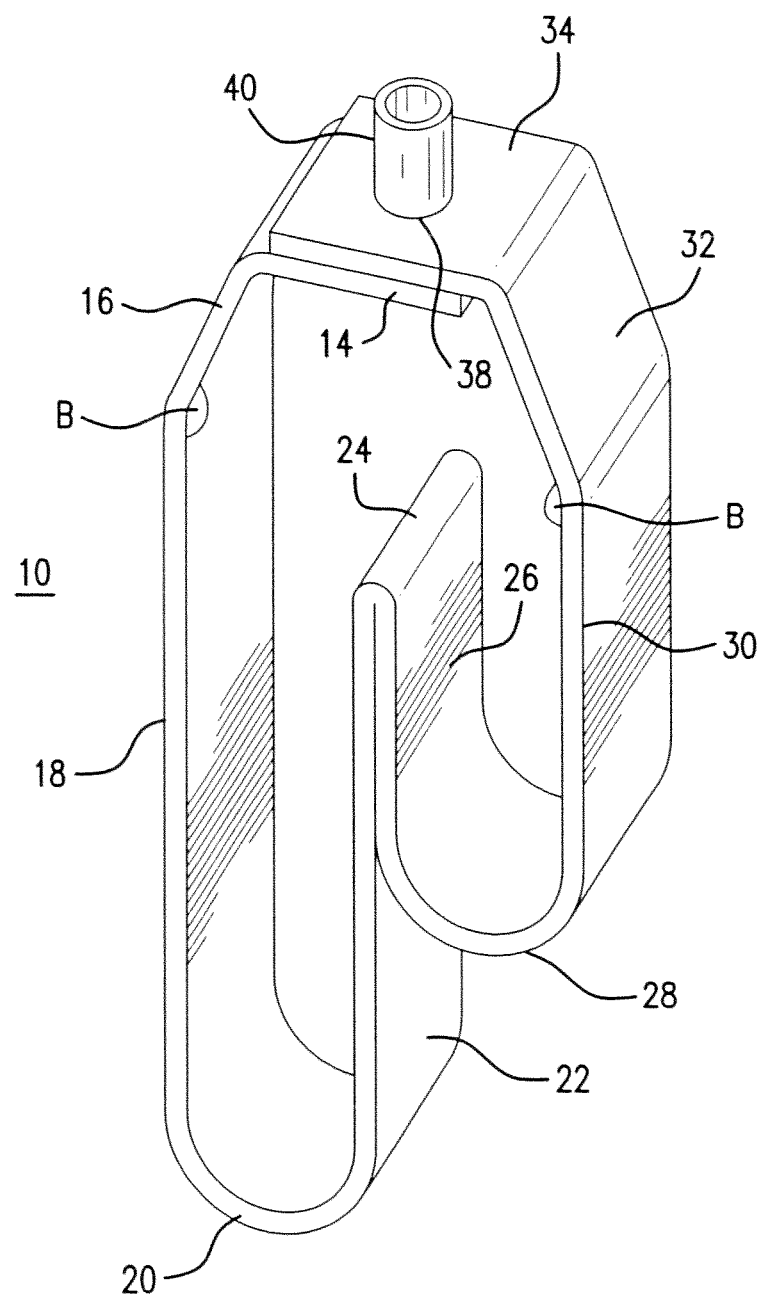
FIG. 1 is a perspective view of a hanger according to one embodiment of he present invention.
Figure 2:
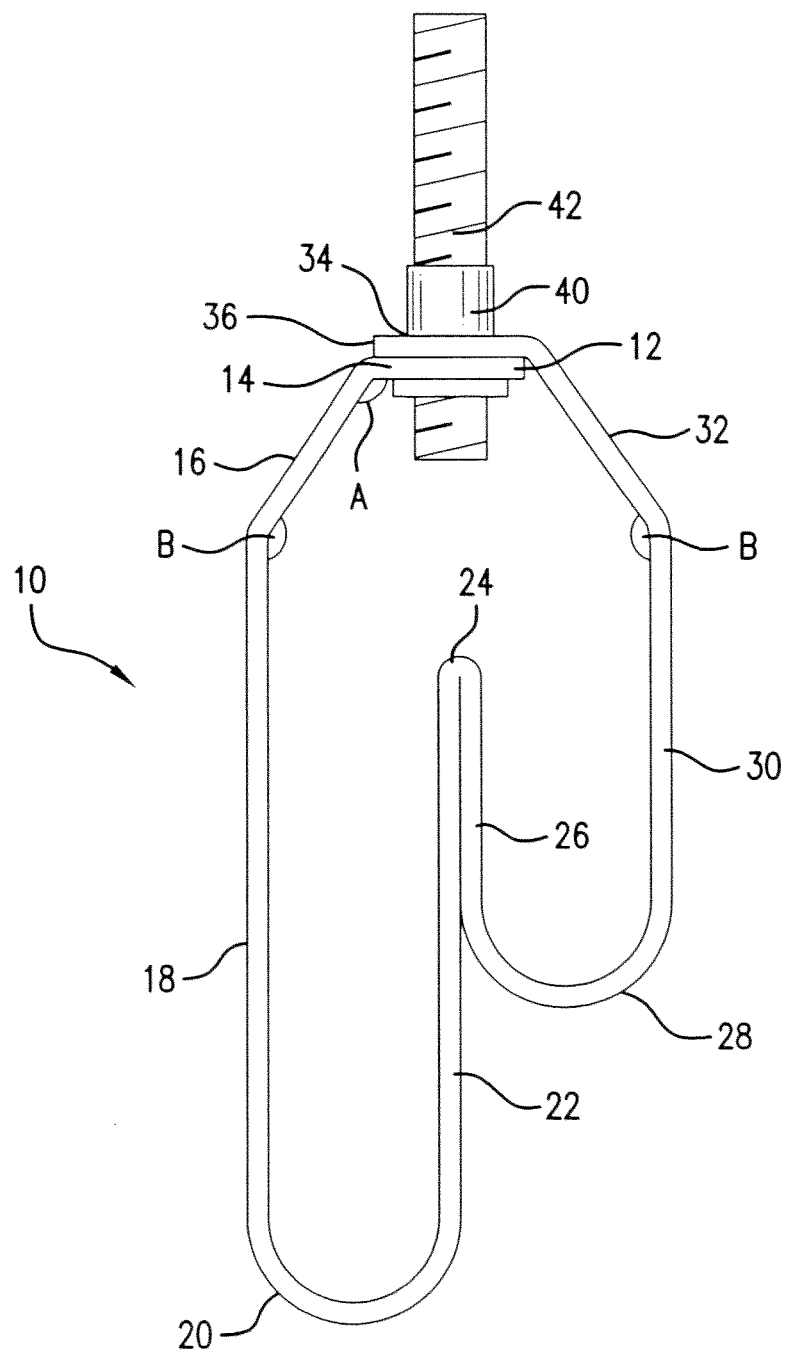
FIG. 2 is a front view of the hanger of FIG. 1.
Figure 3:
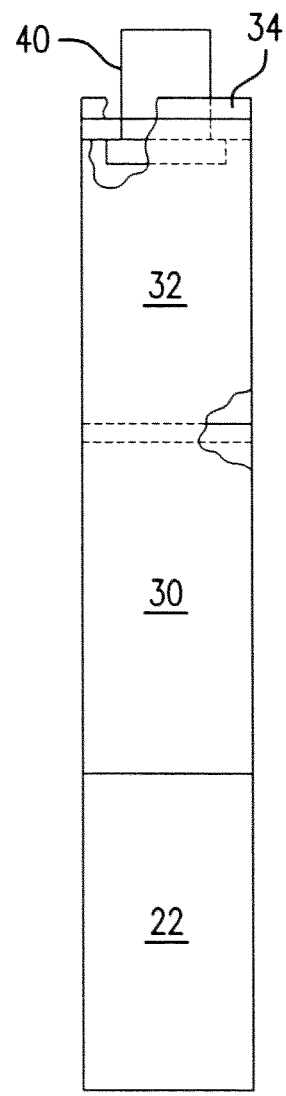
FIG. 3 is a side view of the hanger of FIG. 1.

FIGS. 1-3 illustrate a hanger 10 according to the present invention, which is configured and constructed to support two pipes. The hanger 10 is made of a single piece of flat stock steel that is about 0.5625 to 1.0 inches in width throughout. The hanger 10 has a first end 12 that is defined by a first straight section 14 that is horizontal in orientation (when used to support pipes). The first section 14 transitions to a second straight angled section 16 that is angled at a first angle A by about 45 degrees from the first section 14, and the second section 16 then transitions to a third straight section 18 that is angled at a second angle B by about another 45 degrees from the second section 16. The third section 18 extends generally vertically (when used to support pipes) to a fourth curved section 20 at the bottom thereof. The fourth section 20 transitions 180 degrees to a fifth straight section 22 that extends vertically upwardly (and parallel to the third section 18) to a sharp 180-degree bend 24 that then transitions into a sixth straight section 26 that extends vertically side-by-side with the fifth section 22. The bottom of the sixth section 26 transitions to a seventh curved section 28 which transitions 180 degrees to an eighth straight section 30 that extends vertically upwardly (and parallel to) the sixth section 26. The eighth section 30 transitions to a ninth straight angled section 32 that is angled at the second angle B of about 45 degrees from the eighth section 30, and the ninth section 32 then transitions to a tenth straight section 34 that is angled by the first angle A by about another 45 degrees from the ninth section 32. The tenth section 34 extends horizontally and is side-by-side with (and parallel to) the first section 14 to overlap the first section 14, with the tenth section 34 terminating at a second end 36.

Adjacent the ends 12 and 36 are two holes 38 provided in the sections 14 and 34. The two holes 38 are aligned so that a threaded insert nut 40 can be inserted through the holes 38. A threaded rod 42 is secured to the insert nut 40, and is used to mount the hanger 10 to an anchor for suspension.

The sections 18, 20 and 22 define a first U-shaped holder for one pipe, and the sections 26, 28 and 30 define a second U-shaped holder for a second pipe. The first U-shaped holder is deeper or longer than the second U-shaped holder so that the two pipes can be suspended at different vertical levels (i.e., with an elevation offset).

The angled sections are created by bending, and such bending can be accomplished through the use of hydraulic benders or other conventional means.

Figure 4:
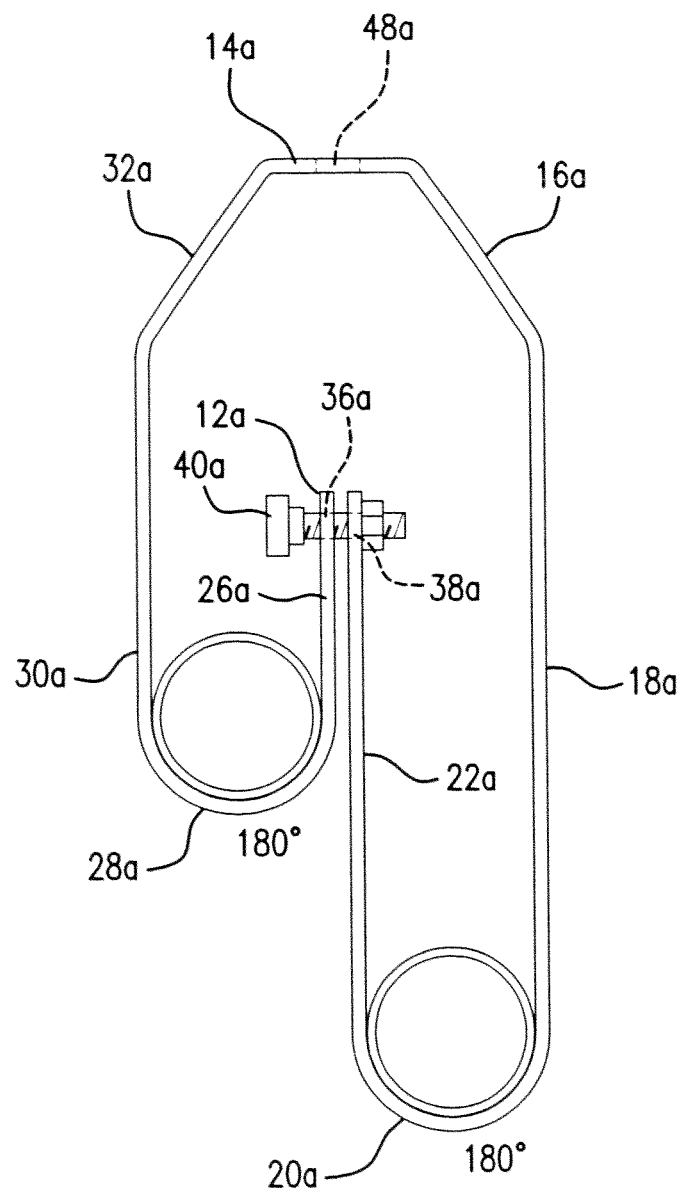
FIG. 4 is a front view of a hanger according to another embodiment of the present invention.

The thickness of the single piece of flat stock steel can be about 0.0625 to 0.125 inches. In addition, the distance between the sections 18 and 22 can be about 6.5 inches, and the distance between the sections 26 and 30 can be about 3.0 inches so to accommodate copper or plastic water or gas pipes. In addition, the following sections can have the following lengths:

14: about 1.25 inches
16: about 1.5 inches
18: about 6.5 inches
22: about 5.5 inches
26: about 2.5 inches
30: about 3.0 inches
32: about 1.625 inches
34: about 1.375 inches FIG. 4 illustrates another embodiment of a single-piece hanger 10a that applies many of the principles of the hanger 10 described above. The hanger 10a is also made of a single piece of flat stock steel that is about 0.5625 to 1.0 inches in width throughout. Instead of the bend 24 in FIGS. 1-3, the hanger 10a has first and second ends 12a and 36a defined at the location of the bend 24. The sections 16a, 18a, 20a, 22a, 26a, 28a, 30a and 32a can be the same as the corresponding sections 16, 18, 20, 22, 26, 28, 30 and 32, respectively, with the same angles/bends between them as in the hanger 10 of FIGS. 1-3. At the top, the two horizontal sections 14 and 34 are replaced by a single straight section 14a. Therefore, the single piece hanger 10a starts at a first end 12a and then transitions into sections 26a, 28a, 30a, 32a, 14a, 16a, 18a, 20a and 22a until it reaches the second end 36a. Pipes are shown in FIG. 4 being supported in the respective U-shaped holders. One U-shaped holder (defined by sections 18a+20a+22a) is deeper or longer than the other U-shaped holder (defined by sections 26a+28a+30a) so that the two pipes can be suspended at different vertical levels.

Adjacent the ends 12a and 36a are two holes 38a provided in the sections 22a and 26a. The two holes 38a are aligned so that a bolt or pin 40a can be inserted through the holes 38a to retain the two ends 12a, 36a together. A third hole 48a is provided at the section 14a to receive an insert nut and its associated threaded rod which are used to mount the hanger 10a to an anchor for suspension.

Figure 5:
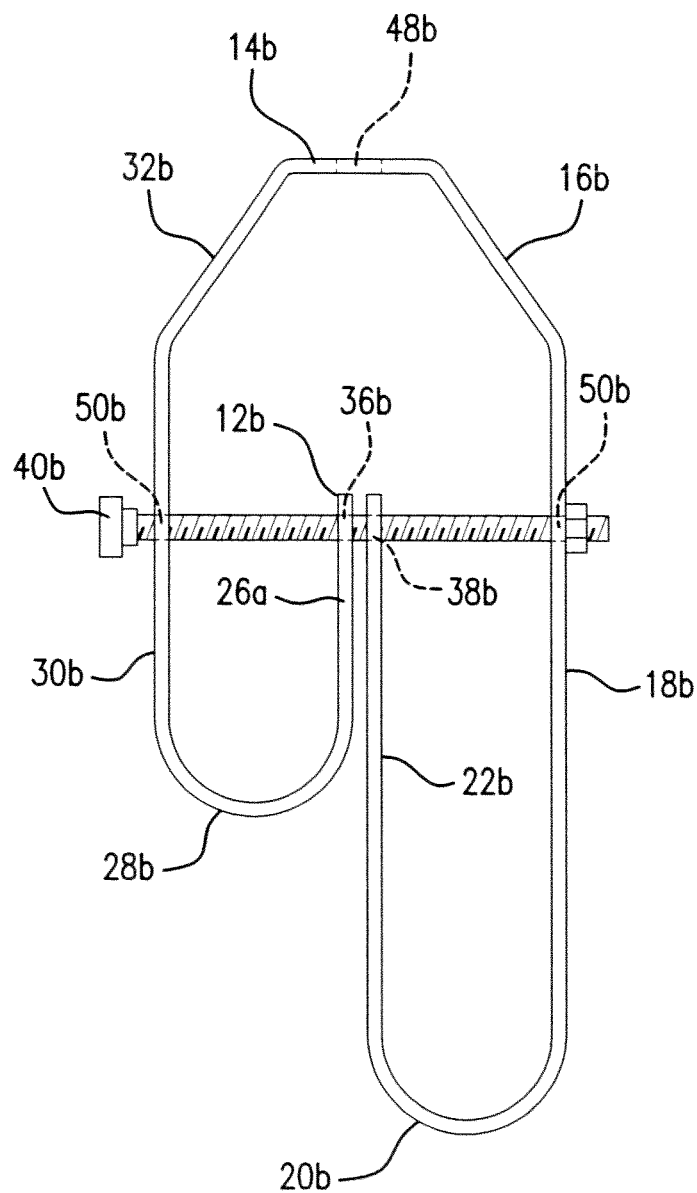
FIG. 5 is a front view of a hanger according to yet another embodiment of the present invention.

FIG. 5 illustrates a modification that can be made to the hangar 10a of FIG. 4. In the embodiment of FIG. 5, the hanger 10b is identical to the hangar 10a in FIG. 4 except that two additional holes 50b are provided in the sections 18b and 30b, and aligned at the same level as the holes 38b in the sections 22b and 26b, so that a longer bolt 40b can be extended through the holes 38b and 50b, and therefore through the sections 18b, 22b, 26b and 30b. By extending the bolt 40b through four sections (as opposed to only two sections in the hanger 10a), the hanger 10b can be used to support heavier pipes. The elements in hanger 10a that are also found in hanger 10b are designated by the same numeral except that a "b" is used for the hanger 10b and an "a" is used for the hanger 10a, and are not described in additional detail herein as they are identical in both embodiments.

The angles A and B between the sections 14+16, 16+18, 30+32 and 32+34 in all three embodiments do not need to be exactly 45 degrees, but can also be any angle between 35 degrees and 60 degrees as long as the sum of the two adjacent angles add up to 90 degrees, and the other two angles must be the same. For example, the angle A between sections 14+16 can be 35 degrees if the angle B between the sections 16+18 is 55 degrees. To ensure symmetry, the angle A between sections 32+34 would have to be 35 degrees, and the angle B between the sections 30+32 would have to be 55 degrees.

Thus, the present invention provides an efficient way to install a plumbing system. The single-piece double hangers of the present invention will allow the installation of two pipes under one support yoke with an elevation offset. The ability to hang two pipes under one yoke will increase the labor efficiency of pipe installation, and reduce the hanging material needed, such as beam brackets, rods, nuts and washers. Having an elevation offset between the two U-shaped holders under one yoke will allow pipe connection to be accomplished in a mechanical manner, and reduce the amount of fitting used in the plumbing system for branch lines. In many pipe installations, access to connecting support rods are limited, so the double hangers of the present invention will mean that half the number of supports rods will be needed in limited access areas.

While the description above refers to particular embodiments of the present invention, it will be understood that many modifications may be made without departing from the spirit thereof.

What is claimed is:

1. A pipe hanging assembly, comprising:
   a single piece of steel having a first upper horizontal section, second and third angled sections coupled to the first section, fourth and fifth vertical sections extending vertically from the second and third sections, respectively, sixth and seventh vertical sections extending vertically and parallel to the fourth and fifth sections, respectively, and eighth and ninth curved sections, with the eighth curved section connecting the fourth and sixth sections to form a first U-shaped holder, and the ninth curved section connecting the fifth and seventh sections to form a second U-shaped holder, with the eighth section disposed at a different elevation than the ninth section, further including a tenth horizontal section that is parallel to, and overlaps, the first horizontal section, with the first section transitioning to the second section and the tenth section transitioning to the third section, and further including a hole provided in each of the first and tenth horizontal sections, the holes being aligned with each other;
   a first pipe supported in the first U-shaped holder; and
   a second pipe supported in the second U-shaped holder.

2. The assembly of claim 1, further including a bend that connects upper ends of the fifth and sixth sections.

* * * * *